(12) United States Patent
Ootaka et al.

(10) Patent No.: US 8,120,483 B2
(45) Date of Patent: Feb. 21, 2012

(54) ELECTROSTATIC OCCUPANT DETECTING APPARATUS AND METHOD OF ADJUSTING ELECTROSTATIC OCCUPANT DETECTING APPARATUS

(75) Inventors: Kouji Ootaka, Toyohashi (JP); Shoichi Yamanaka, Anjo (JP)

(73) Assignee: Denso Corporation, Kariya (JP)

( * ) Notice: Subject to any disclaimer, the term of this patent is extended or adjusted under 35 U.S.C. 154(b) by 427 days.

(21) Appl. No.: 12/462,925

(22) Filed: Aug. 11, 2009

(65) Prior Publication Data

US 2010/0073181 A1 Mar. 25, 2010

(30) Foreign Application Priority Data

Sep. 19, 2008 (JP) ................................. 2008-241083
May 13, 2009 (JP) ................................. 2009-116205

(51) Int. Cl.
  *G08B 13/26* (2006.01)
(52) U.S. Cl. ......... 340/561; 340/562; 340/565; 324/679
(58) Field of Classification Search .................... 340/561
See application file for complete search history.

(56) References Cited

U.S. PATENT DOCUMENTS

| 6,517,106 | B1 | 2/2003 | Stanley et al. |
| 6,520,535 | B1 | 2/2003 | Stanley et al. |
| 2005/0275202 | A1* | 12/2005 | Wato et al. ................... 280/735 |
| 2006/0164254 | A1* | 7/2006 | Kamizono et al. ............. 340/667 |
| 2008/0100425 | A1* | 5/2008 | Kiribayashi ............... 340/425.5 |

FOREIGN PATENT DOCUMENTS

| JP | 11-271463 | 10/1999 |
| JP | 2000-153749 | 6/2000 |
| JP | 2003-156551 | 5/2003 |
| JP | 2006-027591 | 2/2006 |
| JP | 2006-201129 | 8/2006 |
| JP | 2006-242907 | 9/2006 |
| JP | 2008-111809 | 5/2008 |
| WO | WO 2007/147735 | 12/2007 |

* cited by examiner

*Primary Examiner* — George Bugg
*Assistant Examiner* — Kerri McNally
(74) *Attorney, Agent, or Firm* — Harness, Dickey & Pierce, PLC

(57) ABSTRACT

In a method of adjusting an electrostatic occupant detecting apparatus, a first group of load circuits is coupled with a sensor property measuring device, an AC voltage signal is applied from a signal source to the first group of load circuits, and a potential difference generating at a resistor of the sensor property measuring device is stored as a first measured value. A second group of load circuits having a load higher than the first group is coupled with the sensor property measuring device, the AC voltage signal is applied from the signal source to the second group of load circuits, and a potential difference generating at the resistor is stored as a second measured value. A measured sensitivity is calculated from the first measured value and the second measured value, and a sensitivity adjusting value is calculated from the measured sensitivity and an ideal sensitivity.

7 Claims, 10 Drawing Sheets

FIG. 5A
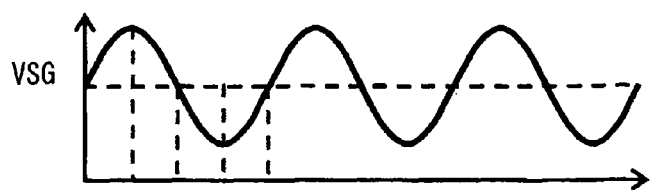
FIG. 5B REAL TERM R SAMPLING
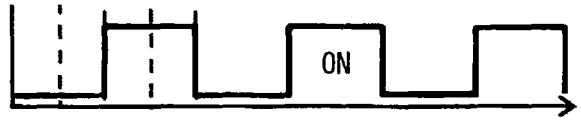
FIG. 5C IMAGINARY TERM C SAMPLING
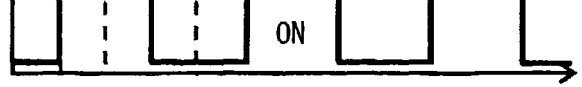
FIG. 5D
REAL TERM R ELECTRIC CURRENT → VOLTAGE
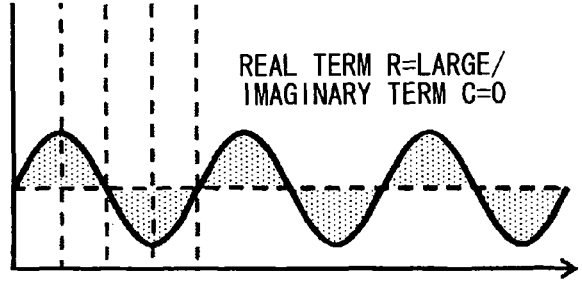
REAL TERM R=LARGE/ IMAGINARY TERM C=0
FIG. 5E
IMAGINARY TERM C ELECTRIC CURRENT → VOLTAGE
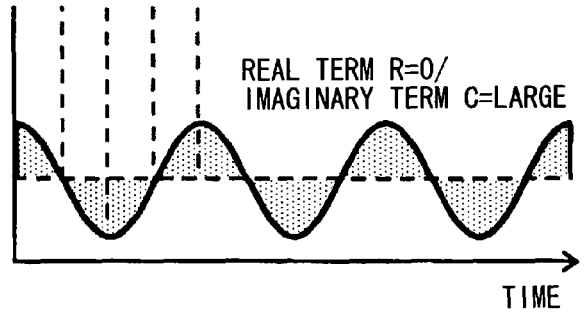
REAL TERM R=0/ IMAGINARY TERM C=LARGE
TIME

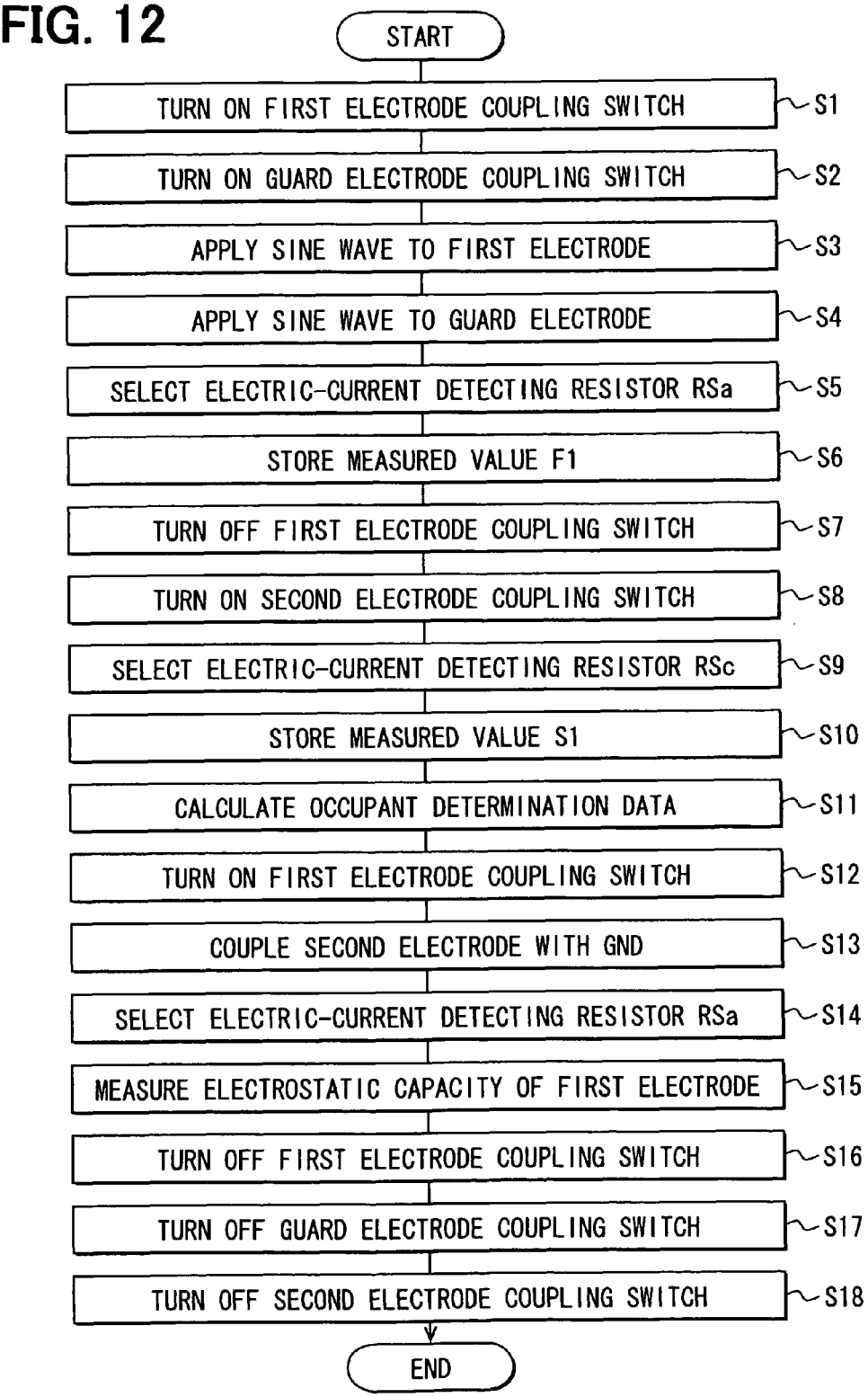

ELECTROSTATIC OCCUPANT DETECTING APPARATUS AND METHOD OF ADJUSTING ELECTROSTATIC OCCUPANT DETECTING APPARATUS

CROSS REFERENCE TO RELATED APPLICATIONS

The present application is based on and claims priority to Japanese Patent Applications No. 2008-241083 filed on Sep. 19, 2008 and No. 2009-116205 filed on May 13, 2009, the contents of which are incorporated in their entirety herein by reference.

BACKGROUND OF THE INVENTION

1. Field of the Invention

The present invention relates to an electrostatic occupant detecting apparatus for detecting a seating of an occupant of a vehicle. The present invention also relates to a method of adjusting an electrostatic occupant detecting apparatus.

2. Description of the Related Art

JP-A-11-271463 discloses an electrostatic occupant detecting apparatus that includes an electrostatic sensor and an occupant detecting electronic control unit (occupant detecting ECU). The electrostatic sensor has a mat shape. The electrostatic sensor detects a change in electric field that generates between a main electrode disposed in a seat and a vehicle body and outputs a detected result as electric current or voltage.

The electrostatic sensor includes a pair of electrodes. When the seat is empty, air is inserted between the pair of electrodes. When a child restraint system (CRS) is disposed on the seat, the CRS is inserted between the pair of electrodes. When an occupant sits on the seat, the occupant is inserted between the pair of electrodes.

Air has a relative permittivity of about 1. The CRS has a relative permittivity depending on materials of the CRS and the relative permittivity is from about 2 to about 5. A human body has a relative permittivity of about 50. Because air, a CRS and a human body have different relative permittivities, an electrostatic capacity between the pair of electrodes of the electrostatic sensor varies by an object inserted between the pair of electrodes.

The electric field between the pair of electrodes changes due to a difference in the electrostatic capacity. The electrostatic sensor detects the change in the electric field between the pair of electrodes and outputs a detected result as electric current or voltage. The occupant detecting ECU determines whether the seat is empty, whether the CRS is disposed on the seat, and whether an adult sits on the seat based on an electric current value or a voltage value from the electrostatic sensor. An airbag ECU controls an inflation/non-inflation of an airbag based on a determination result of the occupant detecting ECU. When the seat is empty or when a CRS is disposed on the seat, the airbag ECU prohibits an inflation of the airbag. When an adult sits on the seat, the airbag ECU allows an inflation of the airbag.

US 2005/0275202 A (corresponding to JP-A-2006-27591) discloses an electrostatic sensor that detects wetness of a seat so as to discriminate a case where an occupant sits on the seat from a case where the seat is empty with a high degree of accuracy.

Water has a relative permittivity of about 80. Because the relative permittivity of water is greater than the relative permittivity of a human body, when the seat is wet, the occupant ECU is difficult to determine whether an occupant sits on the seat. Thus, a sub electrode is provided in the electrostatic sensor for detecting wetness. The electrostatic sensor detects a change in electric field between the sub electrode and the main electrode disposed in the seat and outputs a detected result as electric current or voltage.

US 2006/0164254 A (corresponding to JP-A-2006-201129) discloses an electrostatic sensor that includes a guard electrode for reducing a capacity. When a seat is empty, the electrostatic sensor reduces electric current flowing between a pair of electrodes used for determining a seating of an occupant. When an occupant sits on the seat, the electrostatic sensor can detect electric current flowing between the pair of electrodes with certainty.

US 2006/0164254 A further discloses an electrostatic sensor that detects electric current flowing between the guard electrode and the main electrode and detects abnormality of a capacitor disposed between the guard electrode and the main electrode based on the detected electric current.

Each of the above-described electrostatic sensors detects a change in electric field generating between predetermined electrodes and outputs a detected result as electric current or voltage. That is, the electric field between the predetermined electrodes depends on whether an occupant sits on the seat, whether the seat is wet, and whether the capacitor has an abnormality, and each of the electrostatic sensors outputs electric current or voltage having a level in accordance with the electric field. Then, the occupant detecting ECU determines whether an occupant sits on the seat, whether the seat is wet, and whether the capacitor has an abnormality based on an electric current value or a voltage value from the electrostatic sensor.

The electric current value or the voltage value depends on the electrostatic capacity between the predetermined electrodes and a resistance component of a circuit in the electrostatic sensor. That is, when the electric current value or the voltage value between the predetermined electrodes is detected with the electrostatic sensor, the detected electric current value or the detected voltage value depends on the resistance component of the circuit. The resistance component includes a resistance of, for example, an occupant, water, and air inserted between the predetermined electrodes. This is because that each of a human body, water, and air corresponds to a parallel circuit of a resistor and a capacitor in an equivalent circuit.

When the electrostatic sensor detects the electric current flowing between the predetermined electrodes, and whether an occupant sits on the seat, whether the seat is wet, and whether the capacitor has an abnormality are determined based on the detected electric current value, the detected electric current value includes an electric current value flowing in the parallel circuit of the resistor and the capacitor between the predetermined electrodes. Thus, if the occupant ECU determines whether an occupant sits on the seat and whether the seat is wet based on the detected electric current value as it is, an accuracy of the determination is limited because the detected electric current value does not depend on only pure electrostatic capacity between the predetermined electrodes.

US 2008/0100425 A discloses an electrostatic occupant detecting sensor that includes a power source, a main electrode, a main wiring part, a guard electrode, an impedance calculating part, a real and imaginary term calculating part, and a determining part. The power source generates an alternating-current (AC) voltage. The main electrode is disposed at a seating part of a seat of a vehicle. The main wiring part couples the power source and the main electrode. The guard electrode is disposed between a seat frame coupled with a vehicle ground and the main electrode. The guard electrode is spaced from the main electrode and opposes the main electrode. The guard electrode restricts generation of an electric field between the seat frame and the main electrode.

The impedance detecting part calculates an impedance from the power source to the main wiring part, the main electrode, and the vehicle body. The real and imaginary term calculating part calculates a real term and an imaginary term of the calculated impedance. The determining part determines whether an occupant sits on the seat based on the imaginary term in the calculated impedance.

The power source applies an AC voltage to the main electrode through the main wiring part, and thereby electric field generates between the main electrode and the vehicle body. The impedance calculating part calculates an impedance of an occupant detecting circuit from the power source to the main wiring part, the main electrode, and the vehicle body. In addition, the real and imaginary term calculating part calculates a real term and an imaginary term of the calculated impedance. In the occupant detecting circuit, the imaginary term corresponds to an electrostatic capacity of the capacitor in the parallel circuit of the resistor and the capacitor provided by an object such as a human body located between the main electrode and the vehicle body. The determining part determines an occupant on the seat based on the imaginary part of the impedance.

In the above-described electrostatic occupant detecting sensor, the imaginary term of the impedance corresponding to the electrostatic capacity between predetermined electrodes is used as a determinating factor. Thereby, the electric capacity between the predetermined electrodes can be calculated more accurately.

However, a sensitivity and a zero-point of the electrostatic sensor in the electrostatic sensor may vary among vehicles. Thus, a determination accuracy of an occupant may vary among vehicles.

SUMMARY OF THE INVENTION

In view of the foregoing problems, it is an object of the present invention to provide a method of adjusting an electrostatic occupant detecting apparatus that can reduce a variation in an occupant determination accuracy among vehicles. Another object of the present invention is to provide an electrostatic occupant detecting apparatus.

According to a first aspect of the present invention, a method of adjusting an electrostatic occupant detecting apparatus is provided. The electrostatic occupant detecting apparatus includes an electrostatic sensor and a sensor property measuring device. The electrostatic sensor includes a first electrode, a second electrode, and a guard electrode. The first electrode and the second electrode are disposed at a seating part of a seat of a vehicle and are spaced from each other. The first electrode and the second electrode are located on an opposite side of the guard electrode from a seat frame electrically coupled with a vehicle ground. The guard electrode is spaced from the first electrode and the second electrode and opposes the first electrode and the second electrode. The sensor property measuring device includes a signal source and a resistor. The signal source is configured to apply an AC voltage signal to the electrostatic sensor. The resistor is configured to generate a potential difference in accordance with an impedance of the electrostatic sensor when the signal source applies the AC voltage signal to the electrostatic sensor. In the method of adjusting the electrostatic occupant detecting apparatus, a plurality of load circuits instead of the electrostatic sensor is coupled with the sensor property measuring device through a switch. Each of the plurality of load circuits includes a parallel circuit of a resistor and a capacitor, each of the plurality of load circuits has a different measured value depending on the parallel circuit, the plurality of load circuits includes a first group of load circuits and a second group of load circuits, and the second group of load circuits has a load higher than the first group of load circuits. The switch is controlled so that the first group of load circuits is coupled with the sensor property measuring device, the AC voltage signal is applied from the signal source of the sensor property measuring device to the first group of load circuits, a potential difference generating at the resistor of the sensor property measuring device is measured, and a measured potential difference is stored as a first measured value. The switch is controlled so that the second group of load circuits is coupled with the sensor property measuring device, the AC voltage signal is applied from the signal source to the second group of load circuits, a potential difference generating at the resistor of the sensor property measuring device is measured, and a measured potential difference is stored as a second measured value. A measured sensitivity is calculated from the first measured value and the second measured value, a sensitivity adjusting value is calculated from the measured sensitivity and an ideal sensitivity, and the sensitivity adjusting value is stored in a nonvolatile memory.

The above-described method can store the sensitivity adjusting value in each vehicle. Thus, a variation in an occupant determination accuracy among vehicles can be reduced.

According to a second aspect of the present invention, an electrostatic occupant detecting apparatus includes an electrostatic sensor, a sensor property measuring device, an arithmetic control part, and a nonvolatile memory. The electrostatic sensor includes a first electrode, a second electrode, and a guard electrode. The first electrode and the second electrode are disposed at a seating part of a seat of a vehicle and are spaced from each other. The first electrode and the second electrode are disposed on an opposite side of the guard electrode from a seat frame electrically coupled with a vehicle ground. The guard electrode is spaced from the first electrode and the second electrode and opposes the first electrode and the second electrode. The sensor property measuring device includes a signal source and a resistor. The signal source is configured to apply an AC voltage signal to the electrostatic sensor. The resistor is configured to generate a potential difference in accordance with an impedance of the electrostatic sensor when the signal source applies the AC voltage signal to the electrostatic sensor. The arithmetic control part is configured to perform a calculation using a measured result of the sensor property measuring device. The nonvolatile memory is configured to store a calculated result of the arithmetic control part. The arithmetic control part calculates a sensitivity adjusting value by a method according to the first aspect of the present invention and stores the sensitivity adjusting value in the nonvolatile memory.

The above-described electrostatic occupant detecting apparatus can store the sensitivity adjusting value in the nonvolatile memory. Thus, when the AC voltage signal is applied from the signal source to the electrostatic sensor and the potential difference generates at the resistor, a load can be calculated With accuracy by using the sensitivity adjusting value stored in the nonvolatile memory. Therefore, a variation in an occupant determination accuracy among vehicles can be reduced.

According to a third aspect of the present invention, an electrostatic occupant detecting apparatus includes an electrostatic sensor, a sensor property measuring device, and an arithmetic control part. The electrostatic sensor includes a first electrode, a second electrode, and a guard electrode. The first electrode and the second electrode are disposed at a seating part of a seat of a vehicle and are spaced from each other. The first electrode and the second electrode are disposed on an opposite side of the guard electrode from a seat frame electrically coupled with a vehicle ground. The guard electrode is spaced from the first electrode and the second electrode and opposes the first electrode and the second electrode. The sensor property measuring device includes a signal source, a switching part, a first resistor, a second resistor, a third resistor, a selecting part, and a detecting part. The signal source is configured to apply an AC voltage signal to the electrostatic sensor. The switching part is configured to be switched so that the AC voltage signal from the source voltage is applied to all of or selected group of the first electrode, the second electrode, and the guard electrode. The first resistor is coupled with the first electrode, the second resistor is coupled with the second electrode, and the third resistor is coupled with the guard electrode. The selecting part is configured to select a potential difference generating between two ends of each of the first resistor, the second resistor, and the third resistor when the AC voltage signal is applied from the source voltage to the first electrode, the second electrode, and the guard electrode through the first resistor, the second resistor, and the third resistor, respectively. The detecting part detects a voltage value due to the potential difference selected by the selecting part. The arithmetic control part is configured to calculate an occupant determination data for determining whether an occupant sits on the seat by adding a voltage value detected by the detecting part from a potential difference generating between the two ends of the first resistor and a voltage value detected by the detecting part from a potential difference generating between the two ends of the second resistor.

The occupant determination data calculated by the above-described electrostatic occupant detecting apparatus is equivalent to an electrostatic capacity of an occupant detected by an electrode having an area equal to the sum of an area of the first electrode and an area of the second electrode. Thus, a signal to noise ratio can be improved, and an occupant determination can be performed with a high degree of accuracy.

BRIEF DESCRIPTION OF THE DRAWINGS

Additional objects and advantages of the present invention will be more readily apparent from the following detailed description of exemplary embodiments when taken together with the accompanying drawings. In the drawings:

FIG. 5A is a diagram illustrating a waveform of a signal applied from a signal source to a detected object;

FIG. 5B is a diagram illustrating a waveform of a signal for sampling a real term R;

FIG. 5C is a diagram illustrating a waveform of a signal for sampling an imaginary term C;

FIG. 5D is a diagram illustrating an output signal at a time when a potential difference generating at an electric-current detecting resistor is sampled based on the signal illustrated in FIG. 5B;

FIG. 5E is a diagram illustrating an output signal at a time when a potential difference generating at the electric-current detecting resistor is sampled based on the signal illustrated in FIG. 5C;

FIG. 12 is a flowchart illustrating a first example of a determination process performed by the electrostatic occupant detecting apparatus according to the second embodiment.

DETAILED DESCRIPTION OF THE EXEMPLARY EMBODIMENTS

First Embodiment

Figure 1:
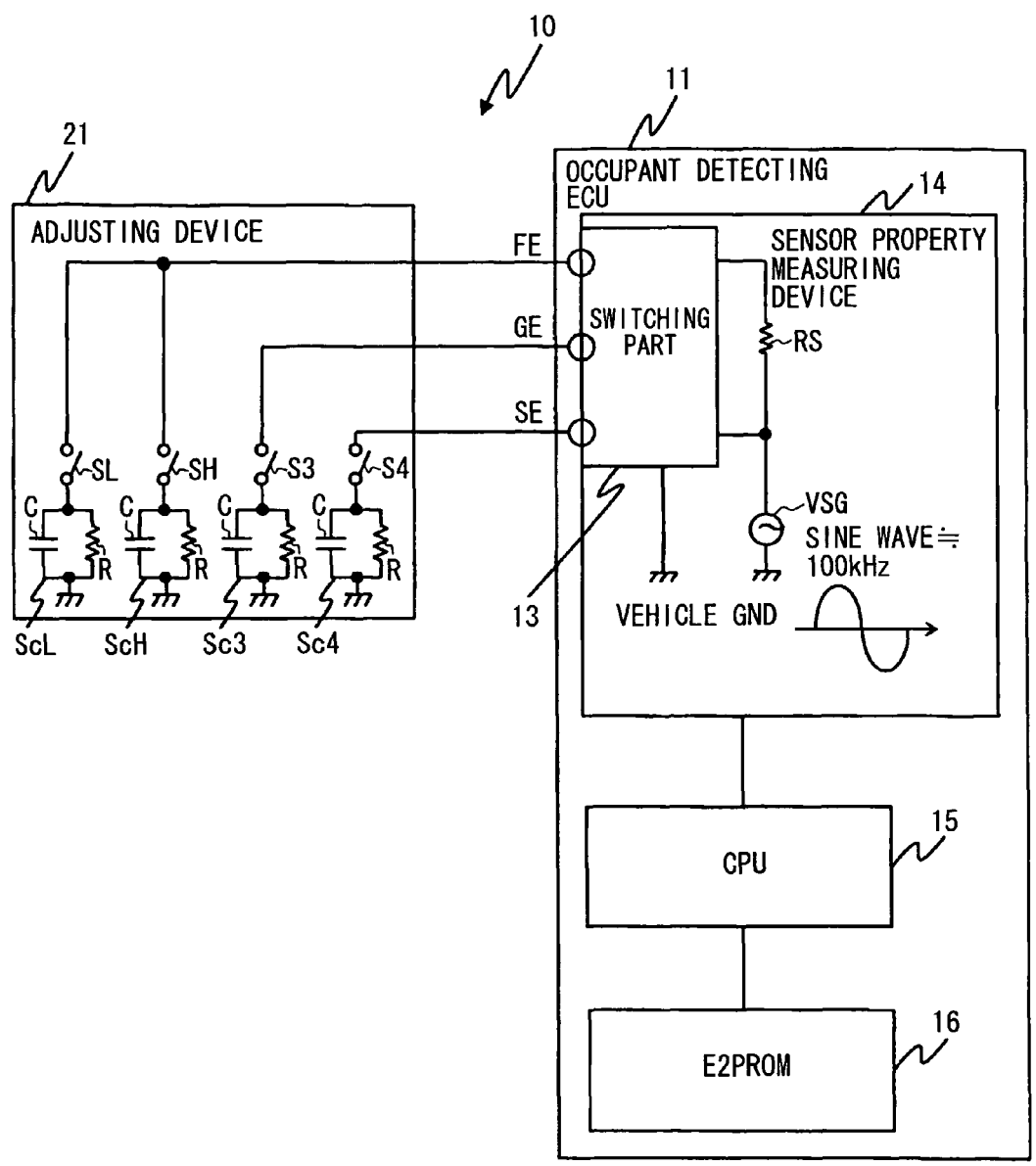
FIG. 1 is a block diagram illustrating an adjusting system of an electrostatic occupant detecting apparatus according to a first embodiment of the present invention.

An adjusting system 10 of an electrostatic occupant detecting apparatus 30 according to a first embodiment of the present invention will be described with reference to FIG. 1 and FIG. 2. The adjusting system 10 includes an occupant detecting ECU 11 and an adjusting device 21. The occupant detecting ECU 11 can function as an arithmetic control part. The occupant detecting ECU 11 includes a switching part 13, a sensor property measuring device 14, a CPU 15, and an E2PROM 16. The switching part 13 is coupled with the adjusting device 21. The sensor property measuring device 14 includes an electric-current detecting resistor RS and a signal source VSG. The signal source VSG supplies a sine wave (i.e., an AC voltage signal) to the adjusting device 21. The E2PROM 16 can function as a nonvolatile memory.

The adjusting device 21 can be used for reducing variation in sensitivity of an electrostatic sensor 31 before coupling the electrostatic sensor 31 with the sensor property measuring device 14.

Figure 2:
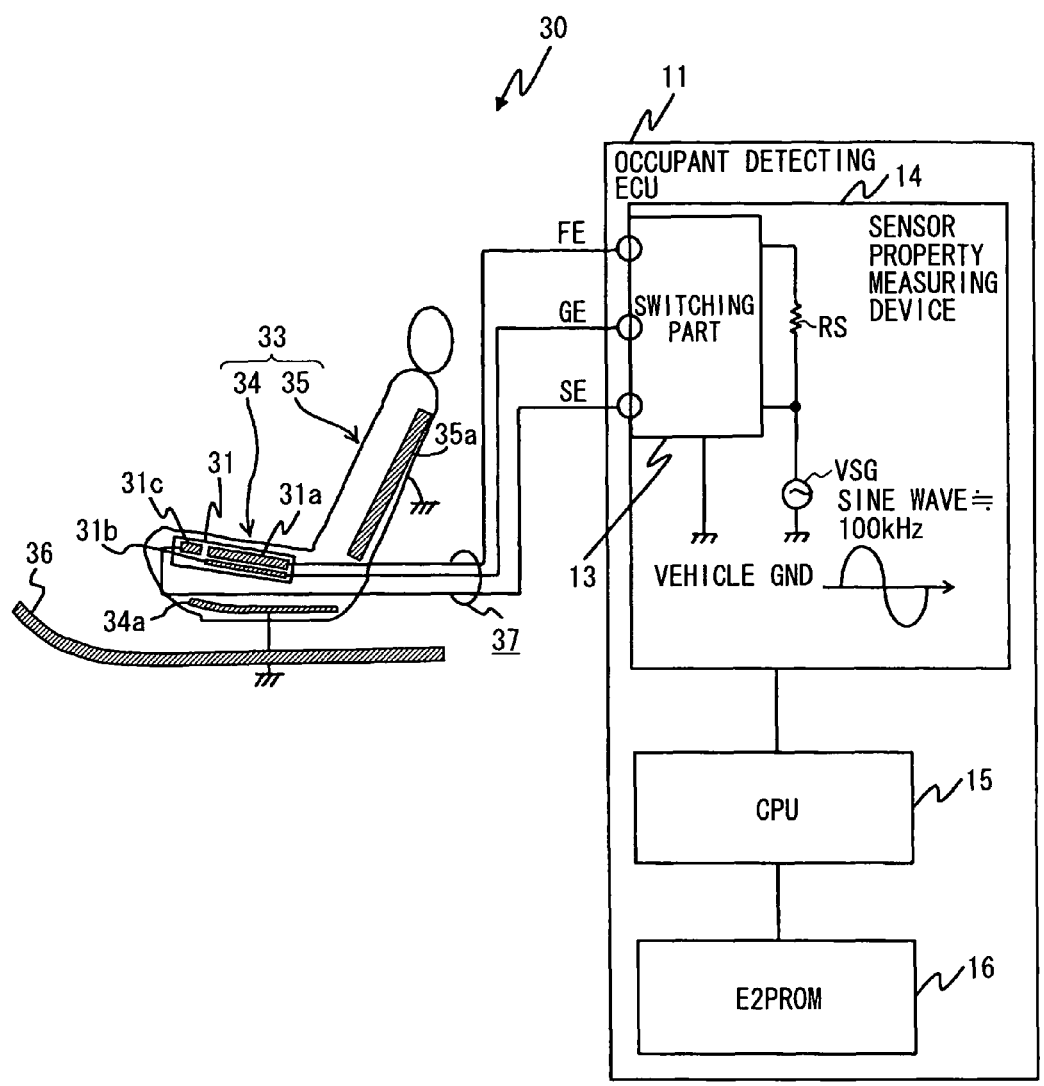
FIG. 2 is a block diagram illustrating the electrostatic occupant detecting apparatus according to the first embodiment.

As shown in FIG. 2, a seat 33 of a vehicle includes a seating part 34 on which an occupant sits and a backrest part 35 against which a back of an occupant leans. At a bottom portion of the seating part 34, a seating part frame 34a is disposed. The seating part frame 34a is electrically coupled with a vehicle body 36. The backrest part 35 includes a backrest part frame 35a electrically coupled with the vehicle body 36.

The electrostatic occupant detecting apparatus 30 includes the electrostatic sensor 31 and the occupant detecting ECU 11. The electrostatic sensor 31 is disposed in the seating part 34. The electrostatic sensor 31 is spaced from the seating part frame 34a and opposes the seating part frame 34a. The electrostatic sensor 31 is disposed between a surface cloth and a cushion of the seating part 34. The electrostatic sensor 31 includes a first electrode (FE) 31a, a second electrode (SE) 31c, and a guard electrode (GE) 31b. The first electrode 31a and the second electrode 31c are adjacent to the surface cloth. The guard electrode 31b is adjacent to the cushion.

The first electrode 31a and the second electrode 31c are spaced from each other and arranged next to each other. The guard electrode 31b is spaced from the first electrode 31a and opposes the first electrode 31a. The guard electrode 31a is disposed between the first electrode 31a and the seating part frame 34a. The electrostatic sensor 31 and the sensor property measuring device 14 are coupled through a connector wiring part 37 including a wire harness.

Figure 3:
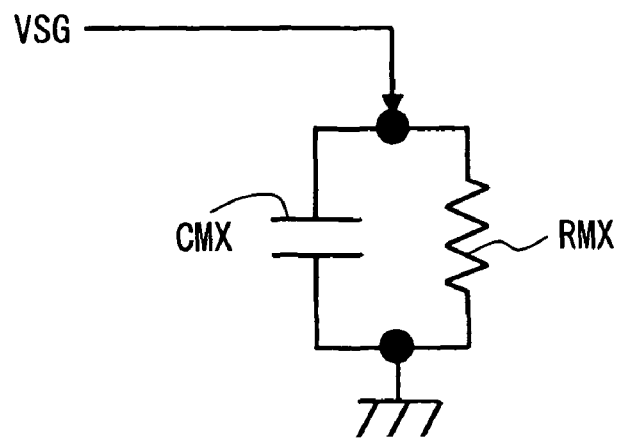
FIG. 3 is an equivalent circuit of a detected object.
Figure 4:
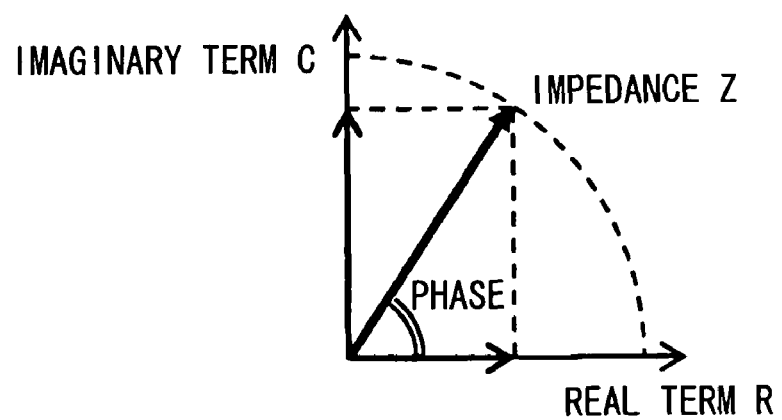
FIG. 4 is a diagram illustrating a signal phase of each of a first electrode, a second electrode, and a guard electrode of an electrostatic sensor.

An equivalent circuit of a detected object including a human body and water detected by the electrostatic occupant detecting apparatus 30 can be expressed by a parallel circuit of a resistor RMX (real term: conductance) and a capacitor CMX (imaginary term: susceptance) as shown in FIG. 3. Thus, the electrostatic occupant detecting apparatus 30 detects an impedance Z having a real term R and an imaginary term C as shown in FIG. 4 rather than detects an electrostatic capacity.

When a signal having a sine wave illustrated in FIG. 5A is applied from the signal source VSG to a detected object, a potential difference generates at the electric-current detecting resistor RS in accordance with an impedance of the detected object. If the impedance of the detected object includes only a real term, the potential difference generating at the electric-current detecting resistor RS does not include a phase gain with respect to the signal of the signal source VSG. Thus, when the potential difference generating at the electric-current detecting resistor RS is sampled based on a signal illustrated in FIG. 5B, which is the same phase as the signal of the signal source VSG, an output signal in accordance with the real term can be obtained as illustrated in FIG. 5D.

If the impedance of the detected object includes only an imaginary term, the potential difference generating at the electric-current detecting resistor RS includes a phase gain with respect to the signal of the signal source VSG. Thus, when the potential difference generating at the electric-current detecting resistor RS is sampled based on a signal illustrated in FIG. 5C, which phase-shifts by 90 degrees from the signal of the signal source VSG, an output signal in accordance with the imaginary term can be obtained as illustrated in FIG. 5E. An impedance of an actual detected object includes a real term and an imaginary term. Thus, an impedance having various phases is measured, and a determination is performed based on the impedance.

Figure 6A:
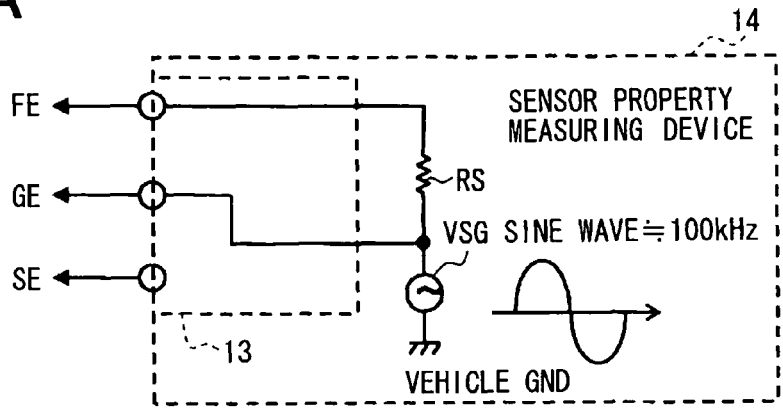
FIG. 6A is a diagram illustrating a state where the first electrode and the guard electrode are applied with a sine wave from a signal source.
Figure 6B:
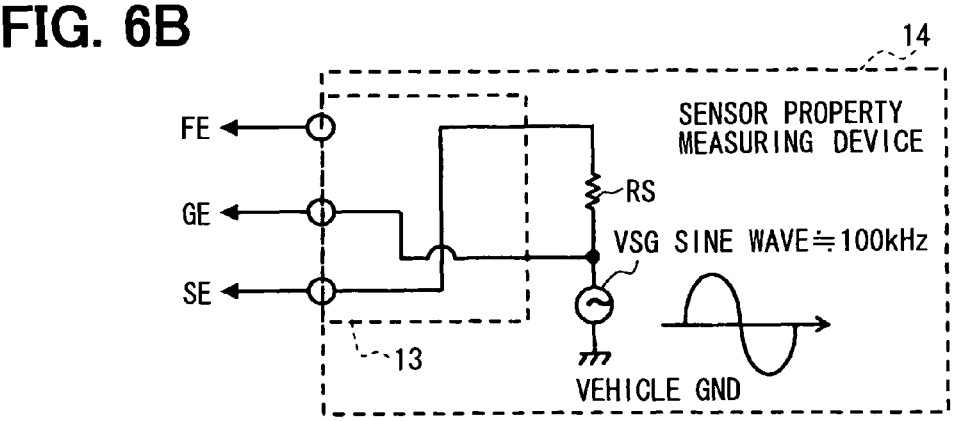
FIG. 6B is a diagram illustrating a state where the guard electrode and the second electrode are applied with the sine wave from the signal source.
Figure 6C:
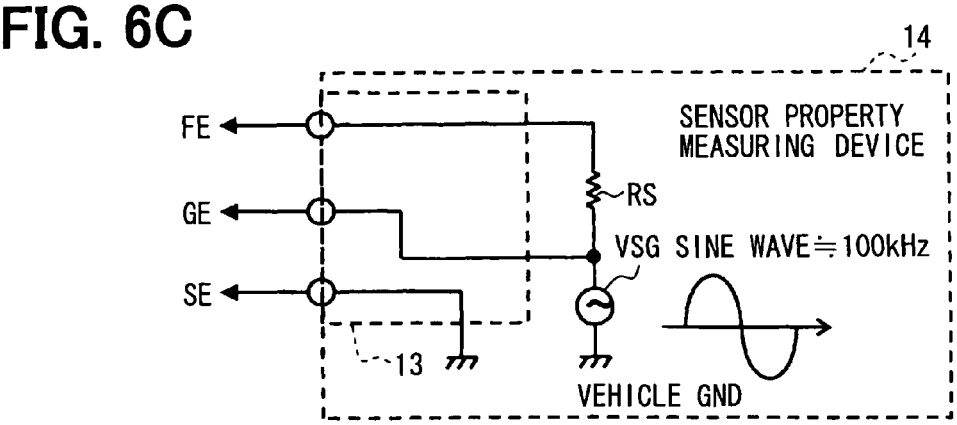
FIG. 6C is a diagram illustrating a state where the first electrode and the second electrode are applied with the sine wave from the signal source and the second electrode is coupled with a vehicle ground.

The switching part 13 of the sensor property measuring device 14 is switched, and the electrostatic capacity is measured with lines of electric force that generates at the electrostatic sensor 31. That is, electric current flows in the electric-current detecting resistor RS in accordance with the supplied signal (sine wave) from the signal source VSG, and the electrostatic capacity is obtained by converting the electric current into voltage. When the switching part 13 selects the first electrode 31a and the guard electrode 31b as shown in FIG. 6A, a seating of an occupant is determined based on an electrostatic capacity that generates between the first electrode 31a and the vehicle ground (vehicle GND). When the switching part 13 selects the second electrode 31c and the guard electrode 31b as shown in FIG. 6B, a seating of an occupant is determined based on an electrostatic capacity that generates between the second electrode 31c and the vehicle GND. When the switching part 13 selects the first electrode 31a, the guard electrode 31b, and the second electrode 31c, wetness of the seat 33 is determined based on the electrostatic capacity that generates between the first electrode 31a and the second electrode 31c.

In this way, the electrostatic occupant detecting apparatus 30 detects the impedance Z of a detected object, determines whether the seat 33 is occupied by a child restraint system (CRS), a child, or an adult, and transmits a determination result to an absorber ECU. The absorber ECU controls activation/deactivation of a passenger-side absorber based on the determination result from the electrostatic occupant detecting apparatus 30 when a collision detecting apparatus detects a collision of the vehicle.

Before measuring with the electrostatic sensor 31, the adjusting device 21 is coupled with the sensor property measuring device 14 as shown in FIG. 1 so as to obtain the sensitivity. The adjusting device 21 includes load circuits ScL, ScH, Sc3, and Sc4. A measured value of each of the load circuits ScL, ScH, Sc3, and Sc4 depends on a resistor R and a capacitor C. The load circuits ScL, ScH, Sc3, and Sc4 are coupled with the switching part 13 through switches SL, SH, S3, and S4, respectively.

Figure 7:
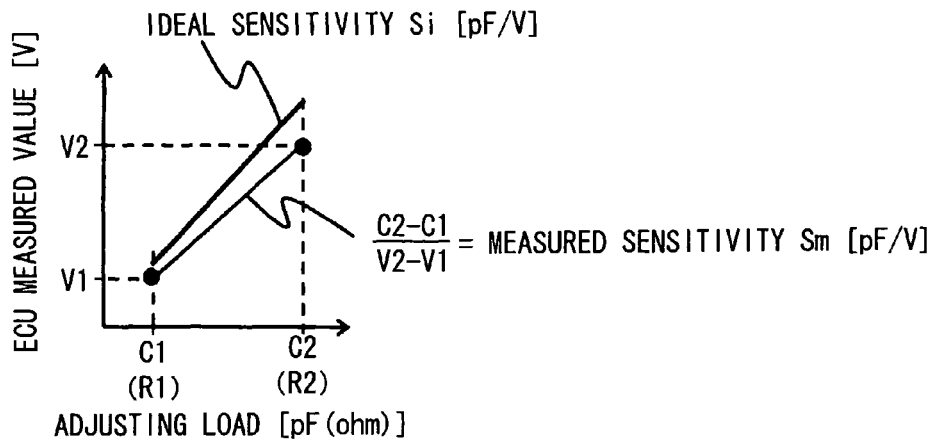
FIG. 7 is a graph illustrating a method of calculating a measured sensitivity and a method of calculating a sensitivity adjusting value.
Figure 8:
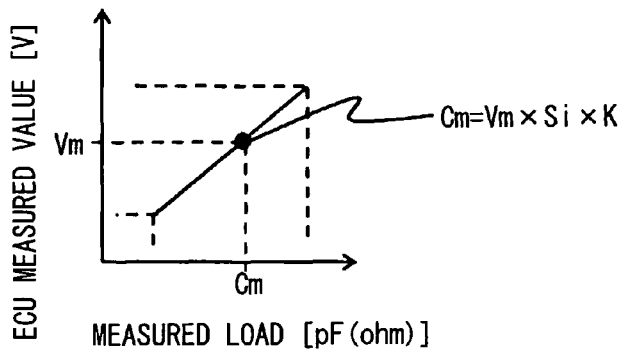
FIG. 8 is a graph illustrating a method of calculating a measured load using the sensitivity adjusting value.
Figure 9:
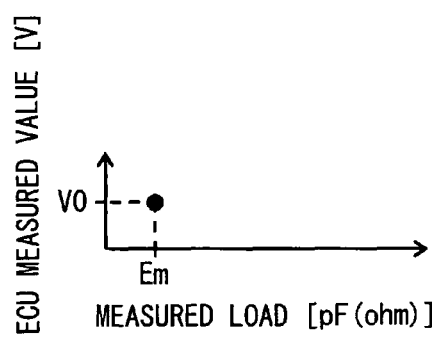
FIG. 9 is a graph illustrating a method of calculating a zero-point adjusting value.

The adjusting device 21 is coupled with the switching part 13 of the sensor property measuring device 14. The sensor property measuring device 14 is operated in an occupant determination mode, and firstly, the load circuits ScL, Sc3, Sc4 are activated, and the measured value is read. That is, as shown in FIG. 7, a first ECU measured value V1 [V] in accordance with an adjusting load C1 (or R1) [pF(Ohm)] when the load circuits ScL, Sc3, and Sc4 are activated is read. Secondly, the load circuits ScH, Sc3, and Sc4 are activated and the measured value is read. That is, a second ECU measured value V1 [V] in accordance with an adjusting load C2 (or R2) [pF(Ohm)] when the load circuits ScH, Sc3, and Sc4 are activated is read.

The CPU 15 calculates a measured sensitivity Sm by applying the first ECU measured value V1 and the second ECU measured value V2 into following formula (1).

$$(C2-C1)/(V2-V1)=Sm[pF/V] \quad (1)$$

Next, a sensitivity adjusting value K is calculated by applying the measured sensitivity Sm and an ideal sensitivity Si into following formula (2).

$$Si/Sm=K \quad (2)$$

The sensitivity adjusting value K is stored in the E2PROM 16.

When the stored sensitivity adjusting value K is used, an ECU measured value Vm is measured in a state where the electrostatic sensor 31 is coupled with the sensor property measuring device 14, and a measured load Cm is calculated from following formula (3).

$$Cm=Vm \times Si \times K \quad (3)$$

The load circuits ScL and ScH are set to be values close to an upper limit and a lower limit of an impedance detection dynamic range so as to adjust an inclination of the sensitivity. An accuracy of the adjusting device 21 may be reduced due to a floating capacity load including wiring to the adjusting device 21. When a load of the adjusting device 21 is measured at each adjusting process and the sensitivity is calculated based on the measured load, the accuracy of the adjusting device 21 can be improved.

The sensor property measuring device 14 is operated in the occupant determination mode in a state where no object is disposed on the electrostatic sensor 31, and an ECU measured value at a zero point is read and is stored in the E2PROM 16 as a zero-point adjusting value Em. The stored zero-point adjusting value Em is used for adjusting a zero point when the measured load C is calculated.

As described above, the electrostatic occupant detecting apparatus 30 according to the present embodiment includes the electrostatic sensor 31 and the sensor property measuring device 14. The electrostatic sensor 31 includes the first electrode 31a, the second electrode 31c, and the guard electrode 31b. The first electrode 31a and the second electrode 31c are disposed in the seating part 34 of the seat 33 of the vehicle and are spaced from each other. The first electrode 31a and the second electrode 31c are disposed on an opposite side of the guard electrode 31b from the seating part frame 34a electrically coupled with the vehicle GND. The guard electrode 31b is spaced from the first electrode 31a and the second electrode 31c and opposes the first electrode 31a and the second electrode 31c. The sensor property measuring device 14 includes the signal source VSG and the electric-current detecting resistor RS. The signal source VSG applies the AC voltage signal to the electrostatic sensor 31. The electric-current detecting resistor RS generates a potential difference in accordance with the impedance of the electrostatic sensor 31 applied with the AC voltage signal.

Instead of the electrostatic sensor 31, the load circuits ScL, ScH, Sc3, Sc4 are coupled with the sensor property measuring device 14 through the switches SL, SH, S3, and S4. The measured value of each of the load circuits ScL, ScH, Sc3, and Sc4 depends on a parallel circuit of the resistor R and the capacitor C. The switches SL, S3, and S4 are turned on and the load circuits ScL, Sc3, Sc4 are coupled with the sensor property measuring device 14. The signal source VSG of the sensor property measuring device 14 applies the AC voltage signal to the load circuits ScL, Sc3, and Sc4, and a potential difference that generates at the electric-current detecting resistor RS is read by the CPU 15 as the first measured value V1.

Next, the switches SH, S3, and S4 are turned on and the load circuits ScH, Sc3, and Sc4 are coupled with the sensor property measuring device 14. In the present case, a load is higher than the above-described case where the load circuits ScL, Sc3, and Sc4 are coupled with the sensor property measuring device 14. The signal source VSG of the sensor property measuring device 14 applies the AC voltage signal to the load circuits ScH, Sc3, Sc4, and a potential difference that generates at the electric-current detecting resistor RS is read by the CPU 15 as the second measured value V2.

The CPU 15 calculates the measured sensitivity from the first measured value V1 and the second measured value V2, and calculates the sensitivity adjusting value from the measured sensitivity and the ideal sensitivity. The sensitivity adjusting value is stored in the E2PROM 16.

Thus, the sensitivity adjusting value of the electrostatic sensor 31 can be stored at each vehicle. Therefore, a variation in the sensitivity of the electrostatic sensor 31 among vehicles can be reduced, and a variation in accuracy of determination of an occupant among vehicles can be reduced.

Furthermore, in a state where the electrostatic sensor 31 is coupled with the sensor property measuring device 14 and no object is disposed on the electrostatic sensor 31, the signal source VSG of the sensor property measuring device 14 applies the AC voltage signal to the electrostatic sensor 31. Then, a potential difference generating at the electric-current detecting resistor RS is stored in the E2PROM 16 as the zero-point adjusting value.

Because the zero-point adjusting value is stored in the nonvolatile memory, the zero point can be adjusted with the zero-point adjusting value at each measurement of the sensor property measuring device 14.

In addition, in a state where the electrostatic sensor 31 is stored in the sensor property measuring device 14, the AC voltage signal is applied from the signal source VSG of the sensor property measuring device 14 to the electrostatic sensor 31. A potential difference generating at the electric-current detecting resistor RS is read by the CPU 15, and the CPU 15 calculates the load by multiplying the potential difference by the ideal sensitivity and the sensitivity adjusting value stored in the E2PROM 16.

Thus, when the AC voltage signal is applied from the signal source VSG of the sensor property measuring device 14 to the electrostatic sensor 31, and a potential difference generates at the electric-current detecting resistor RS, an appropriate load can be calculated by multiplying the potential difference by the ideal sensitivity and the sensitivity adjusting value. Therefore, a variation in the sensitivity of the electrostatic sensor 31 among vehicles can be reduced, and a variation in accuracy of the occupant determination among vehicles can be reduced.

The electrostatic occupant detecting apparatus 30 reduces an initial variation of the sensor property measuring device 14 by correcting an impedance measured value used for the occupant determination with the sensitivity adjusting value and the zero-point adjusting value. Thus, the electrostatic occupant detecting apparatus 30 can measure the impedance with a high degree of accuracy without increasing elements in the sensor property measuring device 14 for reducing the initial variation.

Second Embodiment

Figure 10:
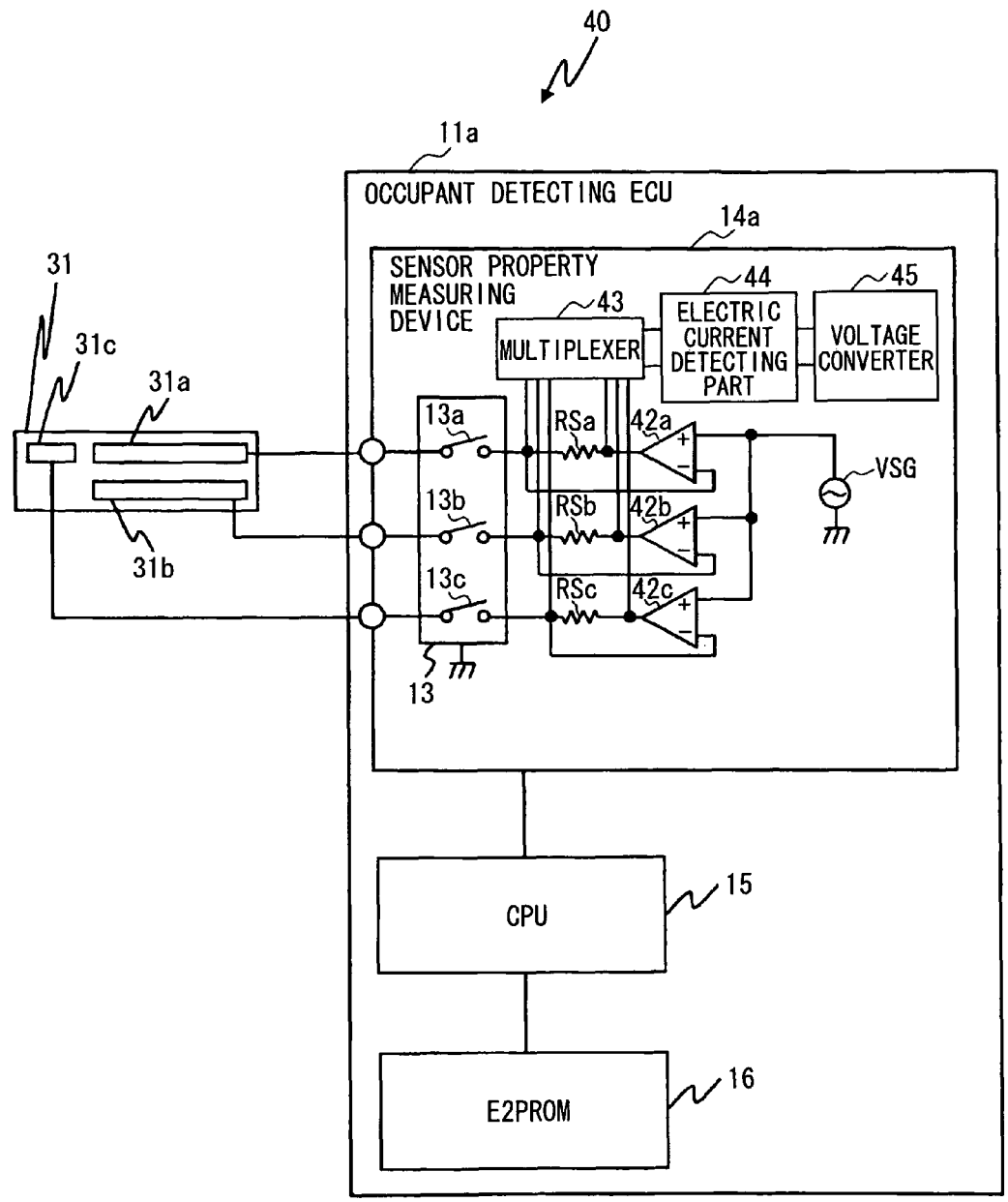
FIG. 10 is a block diagram illustrating an electrostatic occupant detecting apparatus according to a second embodiment of the present invention.
Figure 11A:
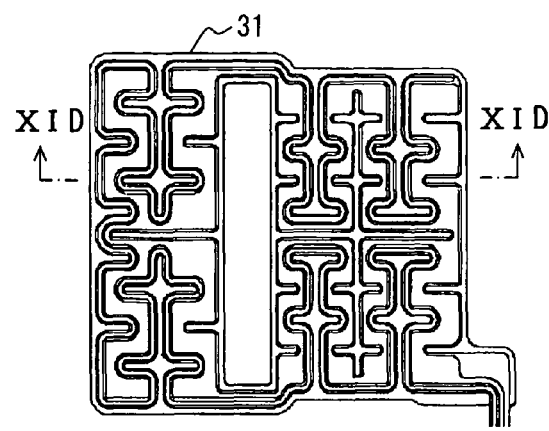
FIG. 11A is a diagram illustrating a plan view of electrodes in an electrostatic sensor.
Figure 11B:
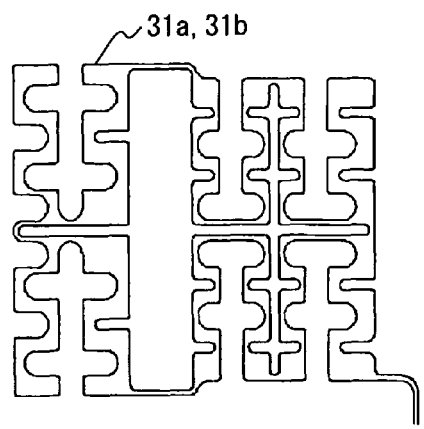
FIG. 11B is a diagram illustrating a plan view of an electrode pattern of a first electrode or a guard electrode.
Figure 11C:
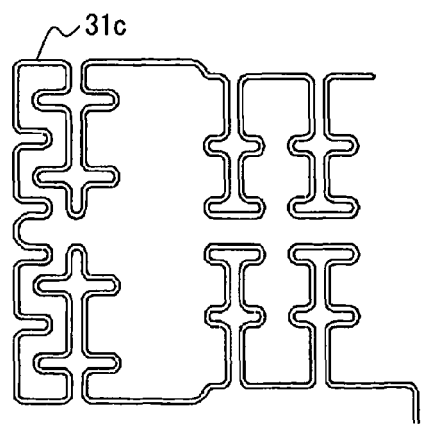
FIG. 11C is a diagram illustrating a plan view of an electrode pattern of a second electrode.
Figure 11D:
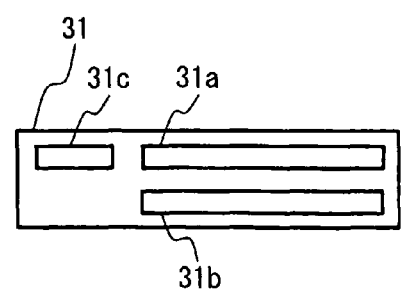
FIG. 11D is a diagram illustrating a cross-sectional view of the electrodes taken along line XID-XID in FIG. 11A.

An electrostatic occupant detecting apparatus 40 according to a second embodiment of the present invention will be described with reference to FIG. 10. The electrostatic occupant detecting apparatus 40 includes the electrostatic sensor 31 having an electrode pattern as shown in FIG. 11A.

When an electrostatic capacity of an occupant is detected with the electrostatic sensor 31, a signal-to-noise ratio (S/N ratio) can be improved by increasing a plane area of the first electrode 31a. However, the plane area of the first electrode 31a is limited because of the electrostatic sensor 31 is disposed at a limited space of the seat 33, and the second electrode 31c for a wetness determination is provided in addition to the first electrode 31a.

The electrostatic occupant detecting apparatus 40 according to the present embodiment includes an occupant detecting ECU 11a. The occupant detecting ECU 11a adds an electrostatic capacity of an occupant detected by the first electrode 31a and an electrostatic capacity of the occupant detected by the second electrode 31c and uses the added value as a measured electrostatic capacity of the occupant. Therefore, an area of the electrostatic sensor 31 used for the occupant determination is increased.

The occupant detecting ECU 11a includes a sensor property measuring device 14a, a CPU 15, and an E2PROM 16. The sensor property measuring device 14a includes a switching part 13, electric-current detecting resistors RSa, RSb, RSc, operational amplifiers 42a, 42b, and 42c, a signal source VSG, a multiplexer 43, an electric-current detecting part 44, and a voltage converter 45. The switching part 13 includes a first electrode coupling switch 13a, a guard electrode coupling switch 13b, and a second electrode coupling switch 13c. The electric-current detecting resistors RSa, RSb, and RSc are coupled with the first electrode coupling switch 13a, the guard electrode coupling switch 13b, and the second electrode coupling switch 13c, respectively. The operational amplifiers 42a, 42b, and 42c are coupled with the electric-current detecting resistors RSa, RSb, and RSc, respectively, and function as drivers. The signal source VSG is coupled with non-inverting input terminals of the operational amplifiers 42a, 42b, and 42c. The multiplexer 43 is coupled with two ends of each of the electric-current detecting resistors RSa, RSb, and RSc, and selects one of the electric-current detecting resistors RSa, RSb, and RSc. The electric-current detecting part 44 detects electric current that flows in the electric-current detecting resistor selected by the multiplexer 43. The voltage converter 45 converts an electric current value detected by the electric-current detecting part 44 into a voltage value.

The first electrode coupling switch 13a, the guard electrode coupling switch 13b, and the second electrode coupling switch 13c are selectively turned on, and a sine wave is applied to the electrostatic sensor 31 through corresponding one of the operational amplifiers 42a, 42b, and 42c and corresponding one of the electric-current detecting resistors RSa, RSb, and RSc. Then, a potential difference generates at corresponding one of the electric-current detecting resistors RSa, RSb, and RSc in accordance with an impedance of an occupant placed on the electrostatic sensor 31. The multiplexer 43 selects the electric-current detecting resistors RSa and RSc in turn, and transmits the potential differences to the electric-current detecting part 44. The electric current value detected at the electric-current detecting part 44 is converted into voltage values at the voltage converter 45. Thus, the electrostatic capacity detected at the first electrode 31a and the electrostatic capacity detected at the second electrode 31c are measured as the voltage values. Furthermore, the CPU 15 adds the electrostatic capacity detected at the first electrode 31a and the electrostatic capacity detected at the second electrode 31c and uses the added value as the occupant determination data. The second electrode coupling switch 13c connects and disconnects the second electrode 31c and the electric-current detecting resistor RSc. In addition, the second electrode coupling switch 13c couples the second electrode 31c with the vehicle GND.

A first example of a determination process performed by the electrostatic occupant detecting apparatus 40 will be described with reference to FIG. 12. In the following method, it is assumed that an occupant sits on the electrostatic sensor 31.

At S1, the first electrode coupling switch 13a is turned on. At S2, the guard electrode coupling switch 13b is turned on. At S3, a sine wave is applied from the signal source VSG to the first electrode 31a. At S4, a sine wave is applied from the signal source VSG to the guard electrode 31b. Thereby, the electrostatic occupant detecting apparatus 40 becomes a state where a seating of an occupant is determined based on an electrostatic capacity that generates between the first electrode 31a and the vehicle GND.

At S5, the multiplexer 43 is switched to select the electric-current detecting resistor RSa coupled with the first electrode 31a and detects a potential difference between the two ends of the electric-current detecting resistor RSa, and thereby the electric-current detecting part 44 detects an electric current value in accordance with the electrostatic capacity of the occupant detected by the first electrode 31a. The electric current value is converted into a voltage value by the voltage converter 45. At S6, the CPU 15 stores the voltage value as an electrostatic capacity measured value F1 of the first electrode 31a.

At S7, the first electrode coupling switch 13a is turned off. At S8, the second electrode coupling switch 13c is turned on. Because the signal source VSG has been in an output state of the sine wave from S3, the electrostatic occupant detecting apparatus 40 becomes a state where a seating of an occupant is determined based on an electrostatic capacity that generates between the second electrode 31c and the vehicle GND.

At S9, the multiplexer 43 is switched to select the electric-current detecting resistor RSc coupled with the second electrode 31c and detects a potential difference between the two ends of the electric-current detecting resistor RSc, and thereby the electric-current detecting part 44 detects an electric current value in accordance with the electrostatic capacity of the occupant detected by the second electrode 31c. The electric current value is converted into a voltage value by the voltage converter 45. At S10, the CPU 15 stores the voltage value as an electrostatic capacity measured value S1 of the second electrode 31c.

At S11, the CPU 15 calculates the occupant determination value by adding the electrostatic capacity measured value F1 of the first electrode 31a and the electrostatic capacity measured value S1 of the second electrode 31c. Then, the occupant determination is performed based on the occupant determination data.

At S12, the first electrode coupling switch 13a is turned on. At S13, the second electrode coupling switch 13c couples the second electrode 31c with the vehicle GND, and thereby the electrostatic occupant detecting apparatus 40 becomes a state where wetness of the seat 33 is determined based on the electrostatic capacity that generates between the first electrode 31a and the second electrode 31c.

At S14, the multiplexer 43 is switched to select the electric-current detecting resistor RSa coupled with the first electrode 31a and detects a potential difference between the two ends of the electric-current detecting,resistor RSa, and thereby, at S15, the electric-current detecting part 44 detects an electric current value in accordance with the electrostatic capacity of the occupant detected by the first electrode 31a. The electric current value is converted into a voltage value by the voltage converter 45. The CPU 15 reads the voltage value as a measured value of the electrostatic capacity detected by the first electrode 31a and wetness of the seat 33 is determined based on the measured value. At S16, the first electrode coupling switch 13a is turned off. At S17, the guard electrode coupling switch 13b is turned off. At S18, the second electrode coupling switch 13c is turned off. Then, the determination process ends.

Figure 13:
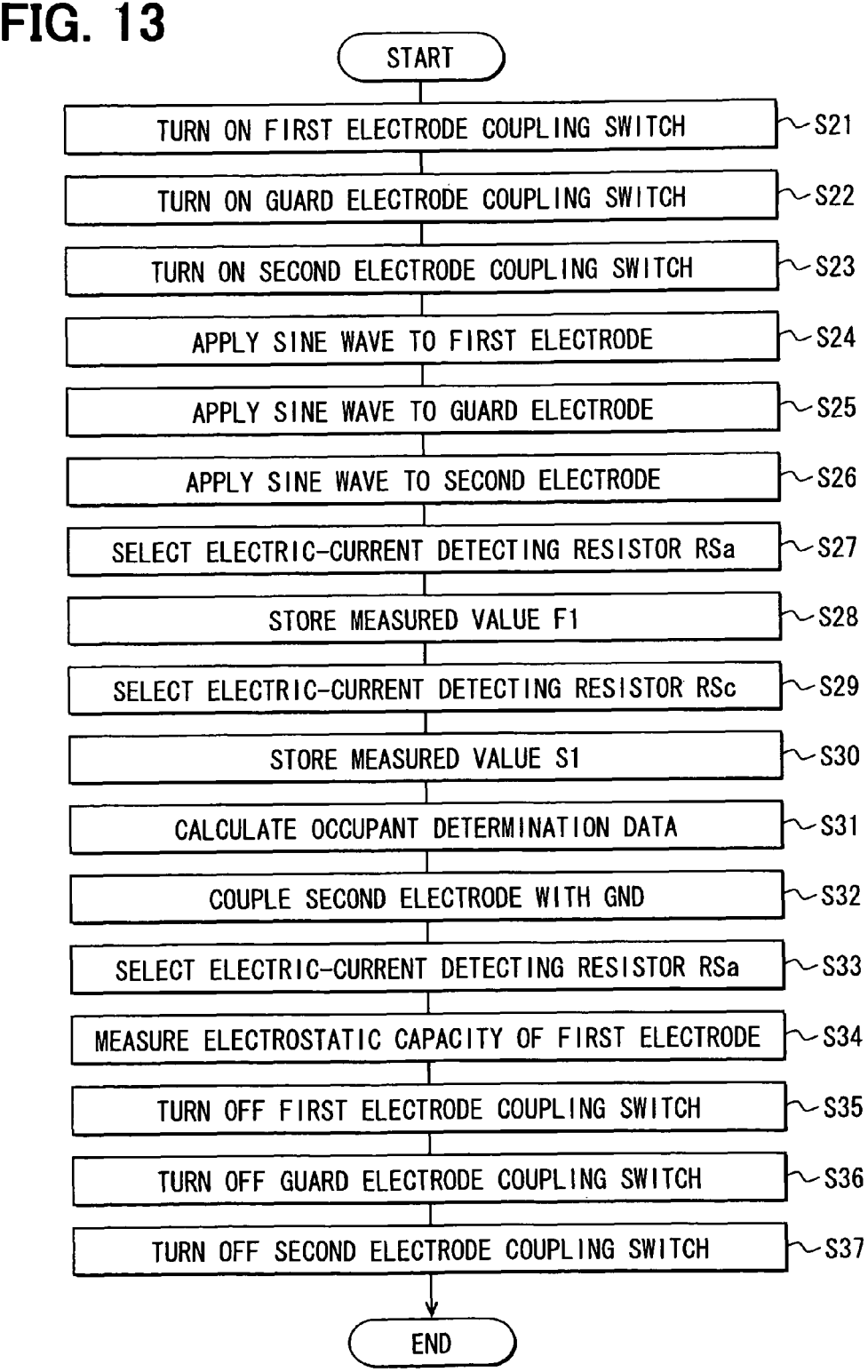
FIG. 13 is a flowchart illustrating a second example of a determination process performed by the electrostatic occupant detecting apparatus according to the second embodiment.

A second example of a determination process performed by the electrostatic occupant detecting apparatus 40 will be described with reference to FIG. 13.

At S21, the first electrode coupling switch 13a is turned on. At S22, the guard electrode coupling switch 13b is turned on. At S23, the second electrode coupling switch 13c is turned on. At S24, the sine wave is applied from the signal source VSG to the first electrode 31a. At S25, the sine wave is applied from the signal source VSG to the guard electrode 31b. At S26, the sine wave is applied from the signal source VSG to the second electrode 31c.

At S27, the multiplexer 43 is switched to select the electric-current detecting resistor RSa coupled with the first electrode 31a and detects a potential difference between the two ends of the electric-current detecting resistor RSa, and thereby the electric-current detecting part 44 detects an electric current value in accordance with the electrostatic capacity of the occupant detected by the first electrode 31a. The electric current value is converted into a voltage value by the voltage converter 45. At S28, the CPU 15 stores the voltage value as an electrostatic capacity measured value F1 of the first electrode 31a.

At S29, the multiplexer 43 is switched to select the electric-current detecting resistor RSc coupled with the second electrode 31c and detects a potential difference between the two ends of the electric-current detecting resistor RSc, and thereby the electric-current detecting part 44 detects an electric current value in accordance with the electrostatic capacity of the occupant detected by the second electrode 31c. The electric current value is converted into a voltage value by the voltage converter 45. At S30, the CPU 15 stores the voltage value as an electrostatic capacity measured value S1 of the second electrode 31c.

At S31, the CPU 15 calculates the occupant determination value by adding the electrostatic capacity measured value F1 of the first electrode 31a and the electrostatic capacity measured value S1 of the second electrode 31c. Then, the occupant determination is performed based on the occupant determination data.

At S32, the second electrode coupling switch 13c couples the second electrode 31c with the vehicle GND, and thereby the electrostatic occupant detecting apparatus 40 becomes a state where wetness of the seat 33 is determined based on the electrostatic capacity that generates between the first electrode 31a and the second electrode 31c.

At S33, the multiplexer 43 is switched to select the electric-current detecting resistor RSa coupled with the first electrode 31a and detects a potential difference between the two ends of the electric-current detecting resistor RSa, and thereby, at S34, the electric-current detecting part 44 detects an electric current value in accordance with the electrostatic capacity of the occupant detected by the first electrode 31a. The electric current value is converted into a voltage value by the voltage converter 45. The CPU 15 reads the voltage value as a measured value of the electrostatic capacity detected by the first electrode 31a and wetness of the seat 33 is determined based on the measured value. At S35, the first electrode coupling switch 13a is turned off. At S36, the guard electrode coupling switch 13b is turned off. At S37, the second electrode coupling switch 13c is turned off. Then, the determination process ends.

As described above, the electrostatic occupant detecting apparatus 40 includes the electrostatic sensor 31, the sensor property measuring device 14a, and the CPU 15. The electrostatic sensor 31 includes the first electrode 31a, the guard electrode 31b, and the second electrode 31c. The first electrode 31a and the second electrode 31c are disposed at the seating part 34 of the seat 33 and are spaced from each other. The first electrode 31a and the second electrode 31c are disposed on the opposite side of the guard electrode 31b from the seating part frame 34a electrically coupled with the vehicle GND. The guard electrode 31b is spaced from the first electrode 31a and the second electrode 31c and opposes the first electrode 31a and the second electrode 31c.

The sensor property measuring device 14a includes the signal source VSG, the switching part 13, the electric-current detecting resistors RSa, RSb, and RSc, the operational amplifiers 42a, 42b, and 42c, the multiplexer 43, the electric-current detecting part 44, and the voltage converter 45. The signal source VSG applies the AC voltage signal to the electrostatic sensor 31. The switching part 13 is controlled so that the sine wave from the signal source VSG is applied to all of or a selected group of the first electrode 31a, the guard electrode 31b, and the second electrode 31c. The electric-current detecting resistors RSa, RSb, and RSc are coupled with the first electrode 31a, the guard electrode 31b, and the second electrode 31c, respectively, through the switching part 13. The multiplexer 43 selects the potential difference that generates between the two ends of each of the electric-current detecting resistors RSa, RSb, and RSc when the sine wave is applied to the first electrode 31a, the guard electrode 31b, and the second electrode 31c through the electric current detecting resistors RSa, RSb, and RSc, respectively. The electric-current detecting part 44 and the voltage converter 45 detect voltage value due to the potential difference selected by the multiplexer 43.

The CPU 15 adds the voltage value obtained at the voltage converter 45 from the potential difference between the two ends of the electric-current detecting resistor RSa and the voltage value obtained at the voltage converter 45 from the potential difference between the two ends of the electric-current detecting resistor RSc and uses the added voltage value as the occupant determination data. Thus, the occupant determination data is equivalent to an electrostatic capacity of an occupant detected with an electrode having an area equal to the sum of an area of the first electrode 31a and an area the second electrode 31c. As a result, the S/N ratio can be improved and a determination of whether an occupant sits on the seat can be performed with accuracy. In other words, in the electrostatic sensor 31, the total area of the electrodes for detecting the electrostatic capacity of the occupant is increased. Thus, the electrostatic sensor 31 can have an effect similar to a case where the electrostatic capacity of the occupant is detected with an electrode having a large area.

The sensor property measuring device 14a stores the first voltage value F1 in accordance with the electrostatic capacity of the first electrode 31a at the CPU 15. The sensor property measuring device 14 further stores the second voltage value S1 in accordance with the electrostatic capacity of the second electrode 31c at the CPU 15. The CPU 15 obtains the occupant determination data by adding the first voltage value F1 and the second voltage value S1. Thus, the electrostatic occupant detecting apparatus 40 can obtain the occupant determination data that is equivalent to a case where an electrostatic capacity of an occupant is detected with an electrode having an area equal to the sum of the area of the first electrode 31a and the area the second electrode 31c. As a result, the S/N ratio is improved and the occupant determination can be performed with a high degree of accuracy.

In addition, after the sensor property measuring device 14a controls the switching part 13 so that the sine wave is applied to all of the first electrode 31a, the guard electrode 31b, and the second electrode 31c, the sensor property measuring device 14a selects the first voltage F1 and the second voltage S1. The CPU 15 obtains the occupant determination data by adding the first voltage value F1 and the second voltage value S1. Thus, a process for switching the AC voltage signal to the first electrode 31a and the second is not required. Therefore, the process can be simplified.

What is claimed is:

1. A method of adjusting an electrostatic occupant detecting apparatus, the electrostatic occupant detecting apparatus including an electrostatic sensor and a sensor property measuring device, the electrostatic sensor including a first electrode, a second electrode, and a guard electrode, the first electrode and the second electrode disposed at a seating part of a seat of a vehicle and being spaced from each other, the first electrode and the second electrode located on an opposite side of the guard electrode from a seat frame electrically coupled with a vehicle ground, the guard electrode being spaced from the first electrode and the second electrode and opposing the first electrode and the second electrode, the sensor property measuring device including a signal source and a resistor, the signal source configured to apply an alternating-current voltage signal to the electrostatic sensor, the resistor configured to generate a potential difference in accordance with an impedance of the electrostatic sensor when the signal source applies the alternating-current voltage signal to the electrostatic sensor, the method comprising:

coupling a plurality of load circuits instead of the electrostatic sensor with the sensor property measuring device through a switch, each of the plurality of load circuits including a parallel circuit of a resistor and a capacitor, each of the plurality of load circuits having a different measured value depending on the parallel circuit, the plurality of load circuits including a first group of load circuits and a second group of load circuits, the second group of load circuits having a load higher than the first group of load circuits;

controlling the switch so that the first group of load circuits is coupled with the sensor property measuring device, applying the alternating-current voltage signal from the signal source of the sensor property measuring device to the first group of load circuits, measuring a potential difference generating at the resistor of the sensor property measuring device, and storing a measured potential difference as a first measured value;

controlling the switch so that the second group of load circuits is coupled with the sensor property measuring device, applying the alternating-current voltage signal from the signal source to the second group of load circuits, measuring a potential difference generating at the resistor of the sensor property measuring device, and storing a measured potential difference as a second measured value; and calculating a measured sensitivity from the first measured value and the second measured value, calculating a sensitivity adjusting value from the measured sensitivity and an ideal sensitivity, and storing the sensitivity adjusting value in a nonvolatile memory.

2. The method according to claim 1, further comprising applying the alternating-current voltage signal from the signal source of the sensor property measuring device to the electrostatic sensor in a state where the electrostatic sensor is coupled with the sensor property measuring device and no object is disposed on the electrostatic sensor, measuring a potential difference generating at the resistor of the sensor property measuring device, and storing a measured potential difference in the nonvolatile memory as a zero-point adjusting value.

3. The method according to claim 1, further comprising applying the alternating-current voltage signal from the signal source of the sensor property measuring device to the electrostatic sensor in a state where the electrostatic sensor is coupled with the sensor property measuring device, measuring a potential difference generating at the resistor of the sensor property measuring device, and calculating a load by multiplying the potential difference by the ideal sensitivity and the sensitivity adjusting value stored in the nonvolatile memory.

4. An electrostatic occupant detecting apparatus, comprising:

an electrostatic sensor including a first electrode, a second electrode, and a guard electrode, the first electrode and the second electrode disposed at a seating part of a seat of a vehicle and being spaced from each other, the first electrode and the second electrode disposed on an opposite side of the guard electrode from a seat frame electrically coupled with a vehicle ground, the guard electrode being spaced from the first electrode and the second electrode and opposing the first electrode and the second electrode;

a sensor property measuring device including a signal source and a resistor, the signal source configured to apply an alternating-current voltage signal to the electrostatic sensor, the resistor configured to generate a potential difference in accordance with an impedance of the electrostatic sensor when the signal source applies the alternating-current voltage signal to the electrostatic sensor;

an arithmetic control part configured to perform calculation using a measured result of the sensor property measuring device; and a nonvolatile memory configured to store a calculated result of the arithmetic control part, wherein the arithmetic control part calculates a sensitivity adjusting value by a method according to claim 1 and stores the sensitivity adjusting value in the nonvolatile memory.

5. An electrostatic occupant detecting apparatus, comprising:

an electrostatic sensor including a first electrode, a second electrode, and a guard electrode, the first electrode and the second electrode disposed at a seating part of a seat of a vehicle and being spaced from each other, the first electrode and the second electrode disposed on an opposite side of the guard electrode from a seat frame electrically coupled with a vehicle ground, the guard electrode being spaced from the first electrode and the second electrode and opposing the first electrode and the second electrode;

a sensor property measuring device including a signal source, a switching part, a first resistor, a second resistor, a third resistor, a selecting part, and a detecting part, the signal source configured to apply an alternating-current voltage signal to the electrostatic sensor, the switching part configured to be switched so that the alternating-current voltage signal from the source voltage is applied to all of or selected group of the first electrode, the second electrode, and the guard electrode, the first resistor coupled with the first electrode, the second resistor coupled with the second electrode, the third resistor coupled with the guard electrode, the selecting part configured to select a potential difference generating between two ends of each of the first resistor, the second resistor, and the third resistor when the alternating-current voltage signal is applied from the source voltage to the first electrode, the second electrode, and the guard electrode through the first resistor, the second resistor, and the third resistor, respectively, the detecting part detects a voltage value due to the potential difference selected by the selecting part; and an arithmetic control part configured to calculate an occupant determination data for determining whether an occupant sits on the seat by adding a voltage value detected by the detecting part from a potential difference generating between the two ends of the first resistor and a voltage value detected by the detecting part from a potential difference generating between the two ends of the second resistor.

6. The electrostatic occupant detecting apparatus according to claim 5, wherein the sensor property measuring device and the arithmetic control part are configured to be controlled in such a manner that:

the switching part is switched so that the alternating-current voltage signal is applied to the first electrode and the guard electrode, the selecting part selects the potential difference generating between the two ends of the first resistor, the detecting part detects a voltage value due to the potential difference generating between the two ends of the first resistor, the arithmetic control part stores the voltage value detected by the detecting part as a first voltage value;

the switching part is switched so that the alternating-current voltage signal is applied to the second electrode and the alternating-current voltage signal is not applied to the first electrode, the selecting part selects the potential difference generating between the two ends of the second resistor, the detecting part detects a voltage value due to the potential difference generating between the two ends of the second resistor, the arithmetic control part stores the voltage value detected by the detecting part as a second voltage value; and the arithmetic control part calculates the occupant determination data by adding the first voltage value and the second voltage value.

7. The electrostatic occupant detecting apparatus according to claim 5, wherein the sensor property measuring device and the arithmetic control part are configured to be controlled in such a manner that the switching part is switched so that the alternating-current voltage signal is applied to all of the first electrode, the second electrode, and the guard electrode, the selecting part selects the potential difference generating between the two ends of the first resistor, the detecting part detects a voltage value due to the potential difference generating between the two ends of the first resistor, the arithmetic control part stores the voltage value detected by the detecting part as a first voltage value, the selecting part selects the potential difference generating between the two ends of the second resistor, the detecting part detects a voltage value due to the potential difference generating between the two ends of the second resistor, the arithmetic control part stores the voltage value detected by the detecting part as a second voltage value, and the arithmetic control part calculates the occupant determination data by adding the first voltage value and the second voltage value.

* * * * *